(12) United States Patent
Sun et al.

(10) Patent No.: US 9,706,209 B2
(45) Date of Patent: Jul. 11, 2017

(54) SYSTEM AND METHOD FOR ADAPTIVELY COMPENSATING DISTORTION CAUSED BY VIDEO COMPRESSION

(71) Applicant: XI'AN JIAOTONG UNIVERSITY, Xi'an (CN)

(72) Inventors: Hongbin Sun, Xi'an (CN); Huisheng Peng, Xi'an (CN); Zenghua Cheng, Xi'an (CN); Xuchong Zhang, Xi'an (CN); Jizhong Zhao, Xi'an (CN); Zongguang Yu, Xi'an (CN); Nanning Zheng, Xi'an (CN)

(73) Assignee: XI'AN JIAOTONG UNIVERSITY, Shaanxi (CN)

( * ) Notice: Subject to any disclaimer, the term of this patent is extended or adjusted under 35 U.S.C. 154(b) by 187 days.

(21) Appl. No.: 14/836,817

(22) Filed: Aug. 26, 2015

(65) Prior Publication Data
US 2016/0044315 A1    Feb. 11, 2016

Related U.S. Application Data

(63) Continuation of application No. PCT/CN2014/076078, filed on Apr. 24, 2014.

(30) Foreign Application Priority Data

Mar. 14, 2014  (CN) .......................... 2014 1 0095798

(51) Int. Cl.
*H04N 19/14* (2014.01)
*H04N 19/117* (2014.01)
(Continued)

(52) U.S. Cl.
CPC ............... *H04N 19/14* (2014.11); *G06T 7/13* (2017.01); *H04N 19/117* (2014.11);
(Continued)

(58) Field of Classification Search
CPC ........................... H04N 19/14; H04N 19/117
See application file for complete search history.

(56) References Cited

U.S. PATENT DOCUMENTS

| | | | |
|---|---|---|---|
| 2009/0052534 A1* | 2/2009 | Wang | H04N 19/176 375/240.13 |
| 2010/0040302 A1 | 2/2010 | Su et al. | 382/261 |

(Continued)

FOREIGN PATENT DOCUMENTS

| | | |
|---|---|---|
| CN | 1170318 A | 1/1998 |
| CN | 1189652 A | 8/1998 |

(Continued)

OTHER PUBLICATIONS

The Chinese Examination Report of corresponding Chinese patent application No. 201410095798.2, dated Jul. 18, 2016.

*Primary Examiner* — Tung Vo
*Assistant Examiner* — Rowina Cattungal
(74) *Attorney, Agent, or Firm* — J.C. Patents

(57) ABSTRACT

The present invention provides a system and method for adaptively compensating distortion caused by video compression, the method first conducts an edge texture detection and block boundary detection to an image, classifies the area where the pixels to be processed is located to determine whether the pixel is located at a ringing artifact prone area or near the block boundary with blocking artifact. Next, according to the area of the pixel to be processed and the degree of distortion, the present invention adaptively compensate the distortion using different filtering strategies, so as to improve image effect of low bit-rate transmission at the display end, so that a real time requirement that playing at a high-definition, and ultra high-definition display is satisfied.

6 Claims, 7 Drawing Sheets

(51) Int. Cl.
- *H04N 19/154* (2014.01)
- *H04N 19/172* (2014.01)
- *H04N 19/186* (2014.01)
- *H04N 19/187* (2014.01)
- *H04N 19/196* (2014.01)
- *H04N 19/463* (2014.01)
- *H04N 19/182* (2014.01)
- *H04N 19/86* (2014.01)
- *G06T 7/13* (2017.01)

(52) U.S. Cl.
CPC ......... *H04N 19/154* (2014.11); *H04N 19/172* (2014.11); *H04N 19/182* (2014.11); *H04N 19/186* (2014.11); *H04N 19/187* (2014.11); *H04N 19/196* (2014.11); *H04N 19/463* (2014.11); *H04N 19/86* (2014.11); *G06T 2207/20004* (2013.01); *G06T 2207/20192* (2013.01)

(56) References Cited

U.S. PATENT DOCUMENTS

| | | | |
|---|---|---|---|
| 2012/0201300 A1* | 8/2012 | Kim | H04N 19/105 375/240.12 |
| 2013/0215958 A1* | 8/2013 | Song | H04N 19/176 375/240.02 |
| 2013/0322529 A1* | 12/2013 | Henry | H04N 19/00569 375/240.12 |

FOREIGN PATENT DOCUMENTS

| | | |
|---|---|---|
| CN | 1436006 A | 8/2003 |
| CN | 102045567 A | 5/2011 |
| CN | 103220529 A | 7/2013 |
| EP | 0 577 350 A2 | 1/1994 |

\* cited by examiner

|  1 |  0 | -1 |
|---|---|---|
|  2 |  0 | -2 |
|  1 |  0 | -1 |

$A_v$

|  1 |  2 |  1 |
|---|---|---|
|  0 |  0 |  0 |
| -1 | -2 | -1 |

$A_h$

|  2 |  1 |  0 |
|---|---|---|
|  1 |  0 | -1 |
|  0 | -1 | -2 |

$A_z$

|  0 |  1 |  2 |
|---|---|---|
| -1 |  0 |  1 |
| -2 | -1 |  0 |

| (1,1) | (1,2) | (1,3) |
|---|---|---|
| (2,1) | (2,2) | (2,3) |
| (3,1) | (3,2) | (3,3) |

SYSTEM AND METHOD FOR ADAPTIVELY COMPENSATING DISTORTION CAUSED BY VIDEO COMPRESSION

CROSS-REFERENCE TO RELATED APPLICATIONS

This application is a continuation of International Application No. PCT/CN2014/076078, filed on Apr. 24, 2014, which claims priority to Chinese Patent Application No. 201410095798.2, filed on Mar. 14, 2014, both of which are hereby incorporated by reference in their entireties.

FIELD OF INVENTION

The present invention relates to the technical field of digital video image processing and display and, in particular, relates to a system and a method for adaptively compensating distortion caused by video compression based on image feature detection, which can protect details of original image.

BACKGROUND OF INVENTION

With the rapid development of internet television and smart television, video content source of digital television is increasingly diversified, wherein online video has become one of the major video contents being watched on television. Due to the limitations of certain factors such as bandwidth and media storage, compression and decompression technology are applied to online video for removing redundant information so as to achieve a low bit-rate transmission, compression standard of which includes video coding and decoding standard of block-based discrete cosine transform (Block-based Discrete Cosine Transform, BDCT) such as MPEG-4 Visual, H.264/AVC, AVS and so on.

However, online video is affected by factors like transmission manner and code-rate control during transmission process, the content of original video image is subjected to distortion of different extents. Positive and negative DCT transformation itself is lossless to video image, however, quantization and inverse quantization during a coding process are main reasons in generating distortion during compression. The distortion caused by video compression primarily includes ringing artifacts and blocking artifact. Near edges of an image, coarse quantization applied to high-frequency information of an image would result in ringing artifacts; in a block-based coding mode, since the correlation between adjacent blocks during block coding is not considered, quantization differences between blocks leads to inconsistency between the blocks, thereby generating blocking artifacts. If such low quality video is displayed on a large-screen flat-panel television, user's visual experience will be seriously affected.

In the existing technology of ringing artifact suppression, US patent publication No. U.S. Pat. No. 7,894,685B2 discloses a method and an apparatus for reducing ringing artifact. The method classifies pixels according to information like mean absolute deviation (Mean Absolute Deviation, MAD) and sum of gradients of pixels' brightness, based on this, counts the number of pixels in flat area and at edges of strong/weak within a 8*8 coding-decoding block, finds an edge block satisfying the conditions and then conducts a Sigma filtering to non-edge flat pixels within the block so as to reduce the ringing artifact. The patent requires coding-decoding information like quantization parameter (Quantization Parameter, QP) to control filtering strength, in addition, the process method based on an 8*8 block is not well applicable for many universal international video coding standards. Therefore, when coding-decoding information like QP is unknown or block with a variable size is adopted during coding-decoding, the effect of the method will be restricted. In other technologies of ringing artifact suppression of the prior art, either image details are blurred while effectively reducing ringing artifact, or effect of ringing artifact reduction is poor while effectively protecting the detail information, i.e., it is difficult to keep a balance therebetween.

Existing method for detecting blocking artifact mainly conducts a block boundary strength detection when the location of block boundary is known. Due to the diversity of original resolution and coding-decoding standards in online video, the video might have already been processed when arriving at the display end, for example, being simply scaling or shifted to any direction. In this case, the result of detecting the block strength at a known block location is certainly inaccurate.

In conclusion, it is necessary to propose a method having an improved robustness, which effectively reduces ringing artifact and blocking artifact while protecting important original information such as edge information and texture information.

SUMMARY OF INVENTION

An objective of the present invention is to provide a system and a method for adaptively compensating distortion caused by video compression, to overcome the defects of the prior art; the present invention effectively compensates the distortion caused by compression, meanwhile enhancing the protection of information of edges and details, so that image effect of an online video is improved, to satisfy the requirement of playing on a displayer with high-definition or even ultra-high-definition. To improve the robustness, the present invention is neither limited to video coding-decoding information and coding-decoding standards, nor limited to video source image shifting or a small amplitude scaling.

The following technical schemes are adopted in the present invention to achieve the above objective:

Firstly, the present invention conducts a feature detection on an input video image, classifies image pixels, and locates a ringing artifact prone area and blocking artifact filtering area; next, it adaptively filters different categories of pixels that satisfies the condition within the area to compensate distortion caused by compression, however, it does not filter the pixels located at the edges and textures to retain important original information.

The present invention proposes a system for adaptively compensating distortion caused by video compression, the system includes an edge detector, a flat/texture detector, a ringing artifact area locator, a line detector, a block boundary detector, a blocking artifact filtering area locator, a blocking artifact suppressing enable judge, an adaptive mean filter, a filtering selector and an output fusion.

Input ends of the edge detector, the flat/texture detector, the line detector, the block boundary detector, the adaptive mean filter, the filtering selector and the output fusion are connected to input port of a video image; output ends of the edge detector and the flat/texture detector are both connected to an input end of the ringing artifact area locator; an output end of the line detector is connected to an input end of the blocking artifact filtering area locator; an output end of the block boundary detector is connected to an output end of the blocking artifact filtering area locator and is connected to an input end of the blocking artifact suppressing enable judge; output ends of the ringing artifact area locator, the blocking artifact filtering area locator and the adaptive mean filter are connected to the input end of the filtering selector; an output end of the filtering selector is connected to an input end of the output fusion.

The further improvement of the present invention lies in that:

The edge detector is configured to obtain edge and strength information of an input video image;

The flat/texture detector is configured to obtain flat/textural information from the input video image;

The line detector is configured to facilitate detecting and retaining of weak single pixel lines in a flat area;

The block boundary detector is configured to detect location and strength information of a block boundary having blocking artifact in the input video image;

The ringing artifact area locator is configured to locate a ringing artifact prone area and label filtering strength thereof, according to the edge information and flat/texture information;

The blocking artifact filtering area locator is configured to locate a blocking artifact filtering area and label the filtering strength thereof, according to the edge information, the flat/texture information, the single-pixel line information and block boundary information;

The blocking artifact suppressing filtering enable judge is configured to calculate a ratio of block boundary in the present frame to the image of a whole frame, turn on the blocking artifact suppressing filtering strength enable when the blocking artifact exceeds a threshold value, for use in a next frame;

The adaptive mean filter is configured to generate results of filtering with different strengths;

The filtering selector is configured to select corresponding filtering results from the results of the original input video image and the adaptive mean filter, according to the results from the ringing artifact area locator, the blocking artifact filtering area locator and the blocking artifact suppressing filtering enable obtained from a previous frame;

The output fusion finally output a weighted sum of an original value and the filtering results of pixel to be possessed of the input video image;

The present invention proposes a method for adaptively compensating distortion caused by video compression, the method includes the following steps:

Edge detection, detecting edge information of an input video image, and conducting erosion and dilation to obtain edge and strength information;

Flat/texture detection, obtaining flat/texture information of the input video image;

Line detection, detecting single pixel line of the input video image;

Block boundary detection, detecting location and strength information of the block boundary of the input video image with blocking artifact;

After excluding edge and texture information, locating a ringing artifact prone area and labeling required filtering strength according to the edge and flat/texture feature information;

After excluding pixels on weak single pixel line of the edge, texture and flat area, locating a blocking artifact filtering area and labeling a required filtering strength according to detected block boundary information;

Calculating a ratio of the detected block boundary of an image in the present frame to the image of a whole frame according to a block boundary result detected by block boundary detector, when a blocking artifact exceeds a threshold value, turning on blocking artifact suppressing filtering strength enable deblk_glen$_N$ for use in a next frame;

Selecting corresponding filtering results output from adaptive filtering coefficients according to the results from the above feature detection and the blocking artifact suppressing filtering enable obtained from a previous frame; and Outputting a weighted sum of as the original value of pixel to be processed and the filtering results, the value of weighted coefficients is decided by the degree of difference between the pixel to be processed and surrounding pixels.

Compared with the prior art, the present invention has the following technical advantages and effects:

1. The present invention can be used at video decoder end, or at a video display processing end which is relatively independent from a video decoder. The present invention is compatible with many present video coding-decoding standards, and does not require known coding-decoding information such as QP and is also not limited to the selection of the size of coding block;

2. The present invention effectively compensates the distortion caused by compression, and meanwhile protecting the original information such as edge and textural information;

3. In the present invention, block boundary information is detected without a requirement for predicting the location of the block boundary in advance. When the video image undergoes a pre-treatment of shifting or small-amplitude scaling, the detection result of block boundary information of the present invention correlates to that of the block boundary of an actual image, so that no false detection will occur;

4. The present invention is based on spatial information processing, having low complexity and is easily achieved by hardware so as to satisfy a real-time requirement.

BRIEF DESCRIPTION OF DRAWINGS

FIG. 3 is a schematic diagram showing gradient operators $A_v$, $A_h$, $A_r$ and $A_l$ being detected in four directions by Sobel edge detection;

FIG. 4 is a 3×3 pixels brightness matrix X for line detection, edge detection and flat/texture detection, (2,2) is the location of pixel to be processed;

FIG. 5 is a schematic diagram of an implementing method for locating the ringing artifact area in an embodiment of the present invention;

FIG. 6 is a schematic diagram of a method for detecting single-pixel line, which mainly detects the single-pixel line in the vertical or horizontal direction;

FIG. 7($b$) shows the extra conditions which need to be satisfied during blocking artifact detection process, and the block boundary with blocking artifact can only be determined after satisfying any one of the four conditions.

DETAILED DESCRIPTION OF EMBODIMENTS

The present invention can be used in combination with a video decoder, and also can act as a part of video display process independently. The present invention will be further described in detail with reference to the accompany drawings and embodiments.

Figure 1:
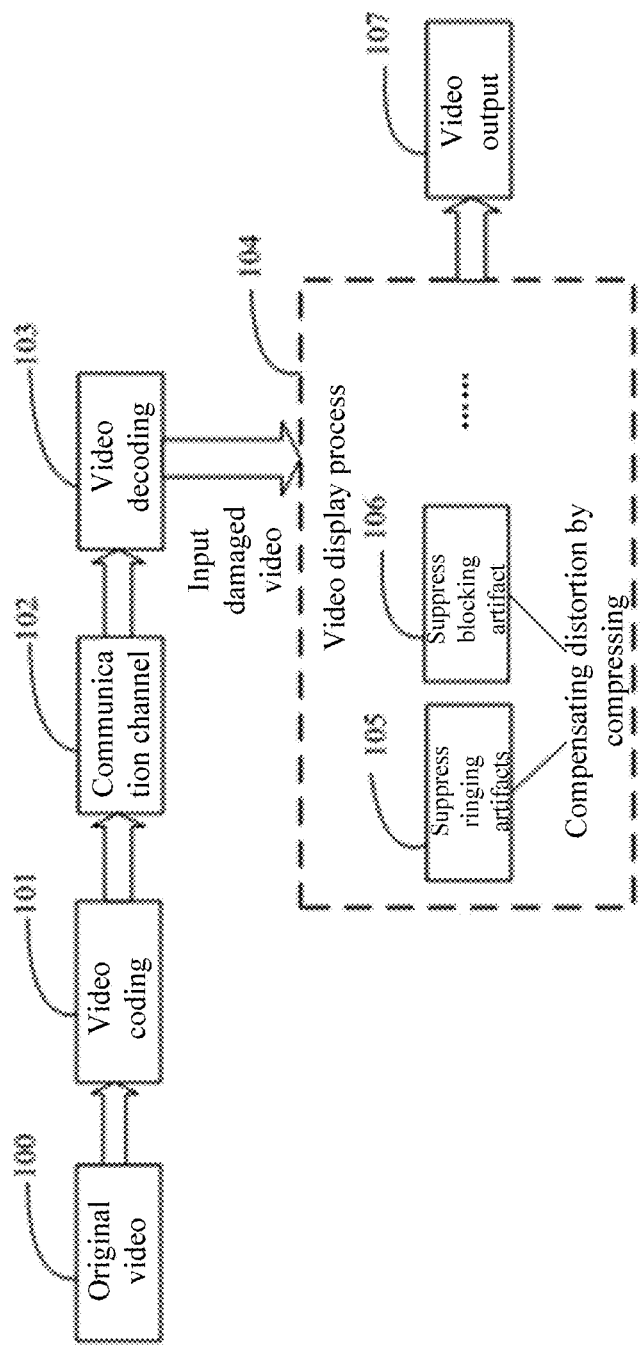
FIG. 1 is a block diagram of an embodiment illustrating a method for compensating distortion caused by compression according to the present invention being processed at a video display end.

FIG. 1 is a block diagram of an embodiment of a method for compensating the distortion caused by compression, the method is used in a system for compensating the distortion caused by compression during video display process according to the present invention. After being compressed by video encoding 101, original video source 100 is transmitted to video decoding 103 at a receiving end of a user through a communication channel 102. A damaged decoded video as the input of video display process 104 undergoes a distortion compensation of suppressing ringing artifact 105 and suppressing blocking artifact 106 and other video display process, then is sent to video output 107 for display.

Figure 2:
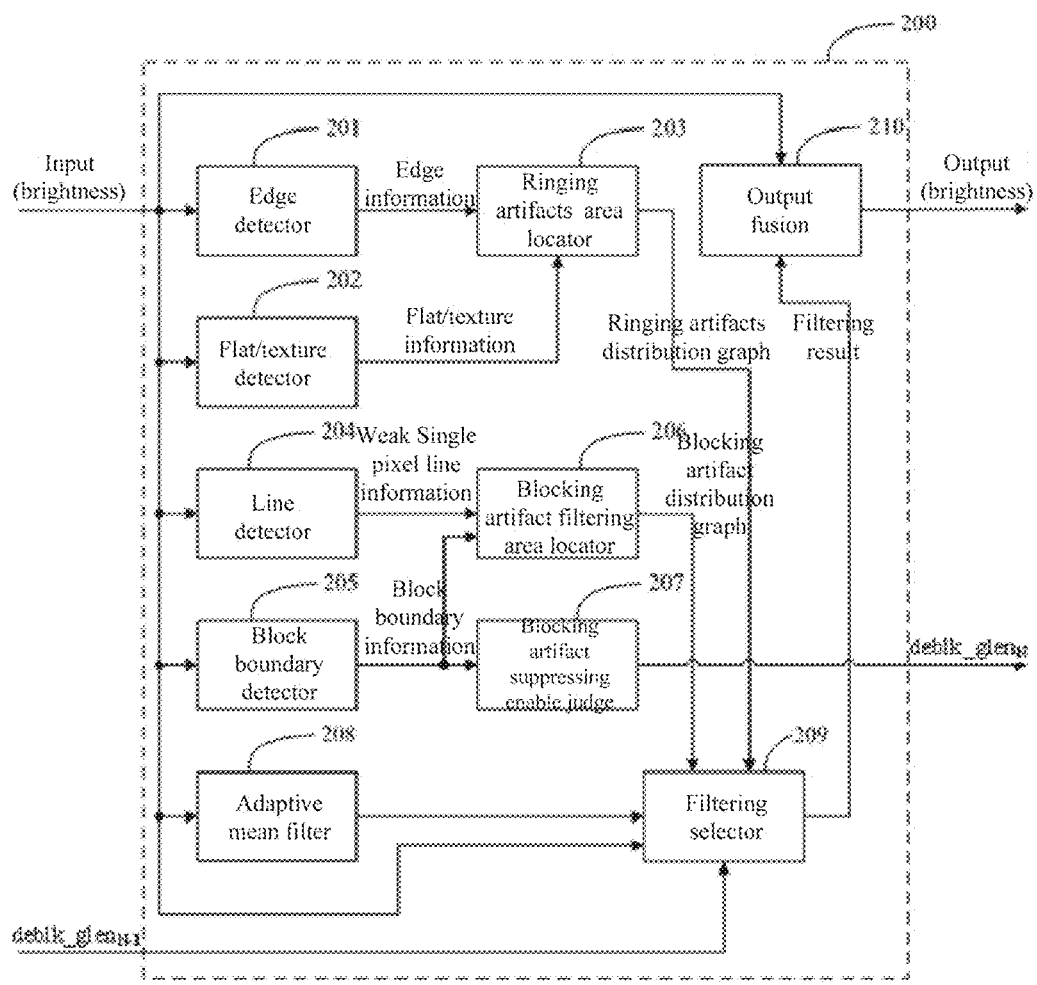
FIG. 2 is a block diagram of an embodiment illustrating a method and a system for compensating distortion caused by compression of the present invention.

The 200 of FIG. 2 is a block diagram of an embodiment of a system for compensating distortion caused by compression as given in FIG. 1. The present invention proposes a system for adaptively compensating distortion caused by video compression, the system including an edge detector 201, a flat/texture detector 202, a ringing artifact area locator 203, a line detector 204, a block boundary detector 205, a blocking artifact filtering area locator 206, a blocking artifact suppressing enable judge 207, an adaptive mean filter 208, a filtering selector 209 and an output fusion 210.

Input video signal enters into input ends of the edge detector 201, the flat/texture detector 202, the line detector 204, the block boundary detector 205, the adaptive mean filter 208, the filtering selector 209, the output fusion 210; output ends of the edge detector 201 and the flat/texture detector 202 are both connected to the ringing artifact area locator 203; an output end of the line detector 204 is connected to an input end of the blocking artifact filtering area locator 206; an output end of the block boundary detector 205 is connected to an input end of the blocking artifact filtering area locator 206 and to an input end of the blocking artifact suppressing enable judge 207; output ends of the ringing artifact area locator 203, the blocking artifact filtering area locator 206, and the adaptive mean filter 208 are connected to the input end of the filtering selector 209; an output end of the filtering selector 209 is connected to an input end of the output fusion 210.

The edge detector 201, the flat/texture detector 202, the line detector 204 and the block boundary detector 205 are four major feature detectors of system 200 for adaptively compensating distortion caused by video compression, of which the edge detector 201 detects edge information of an input video image and conducts erosion and dilation to obtain relatively accurate edge and strength information; the flat/texture detector 202 obtains flat/textural information from the input video image to retain the textural information and to facilitate locating the distortion prone areas; the line detector 204 detects the single-pixel line from the input video image to help retain single-pixel weak line in a flat area, avoiding loss of layers and details of the video image due to false filtering while conducting a blocking artifact suppressing process; the block boundary detector 205 detects the location and strength information of block boundary of an input video image with blocking artifact. By analyzing the detection results from these four feature detectors, the present invention can perfectly protect important feature information such as edge and texture of the original image and the single-pixel weak lines in a flat area, thereby preventing a secondary damage to a damaged video image and providing a dependency for locating the artifact area and deciding filtering strength.

After excluding important information like edge and textural information, the ringing artifact area locator 203 locates the ringing artifact prone area and labels required filtering strength according to the edge and flat feature information; after removing pixels at the edge, texture as well as at the single-pixel weak line in flat areas, the blocking artifact area locator 206 locates blocking artifact filtering area and labels required filtering strength according to the detected block boundary information; the blocking artifact suppressing enable judge 207 obtains the block boundary results from the block boundary detector 205, calculates the ratio of block boundary to the image of the whole frame in the present frame, when the blocking artifact is relatively serious, turn on the blocking artifact suppressing filtering strength enable deblk_glen$_N$ for use of the next frame.

The adaptive filter 208 generates adaptive filtering results with different strengths for selection; the filtering selector 209 selects the corresponding adaptive filtering result according to the result of the above feature detection and the blocking artifact suppressing filtering enable deblk_glen$_{N-1}$ obtained from the previous frame; the output fusion 210 achieves a weighted sum of the original values of the pixel to be processed and the filtering result, the value of the weight coefficient depends on the degree of difference between the pixel to be processed and the surrounding pixels so as to better protect the original image.

FIG. 3 shows gradient operators $A_v$, $A_h$, $A_r$ and $A_l$ of four directions in Sobel edge detection used by the edge detector 201 of embodiment 200 in the present invention. Calculate gradient values $G_v$, $G_h$, $G_r$ and $G_l$ of four directions in combination with a 3×3 pixel brightness matrix X of FIG. 4, and then take the maximum value from gradient absolute value as $G_{max}$, compare, respectively, with the threshold values SOBEL_HIGH_TH (270) and SOBEL_LOW_TH (65), and classify the image pixels to obtain whole edge information and strong edge information, as shown in equations (1) and (2).

$$G_{max} = \max(|G_h|, |G_v|, |G_r|, |G_l|) \quad (1)$$

$$\text{edge\_tmp}(i, j) = (G_{max} > \text{SOBEL\_LOW\_TH}) ? 1 : 0$$

$$\text{stedge\_tmp}(i, j) = (G_{max} > \text{SOBEL\_HIGH\_TH}) ? 1 : 0 \quad (2)$$

In the equations, edge_tmp(i, j) and stedge_tmp(i, j) are the whole edge information and the strong edge information of a pixel at the location (i, j) of an image respectively.

Due to the interference such as artifact, the result from above edge detection is not accurate to some extent. Thus, the edge detector 201 further conducts erosion and dilation to the result obtained from the Sobel edge detection so as to obtain relatively accurate edge information. The specific process of erosion and dilation is shown in equations (3) and (4). The final output of whole edge information by the edge detector 201 is shown in equation (5).

$$\text{edge\_corrosion}(i, j) = \text{edge\_tmp}(i, j) \,\&\&\, \left( \sum_{s=-1}^{1} \sum_{t=-1}^{1} \text{edge\_tmp}(i+s, j+t) \geq 3 \right) \quad (3)$$

$$\text{edge\_expansion}(i, j) = [!\text{edge\_tmp}(i, j)] \&\& \quad (4)$$
$$\{[\text{edge\_tmp}(i-1, j-1) \&\& \text{edge\_tmp}(i+1, j+1)]$$
$$||[\text{edge\_tmp}(i, j-1) \&\& \text{edge\_tmp}(i, j+1)]$$
$$||[\text{edge\_tmp}(i+1, j-1) \&\& \text{edge\_tmp}(i-1, j+1)]$$
$$||[\text{edge\_tmp}(i-1, j) \&\& \text{edge\_tmp}(i+1, j)]\}$$

$$\text{edge\_map}(i, j) = \text{edge\_corriosion}(i, j) || \text{edge\_expansion}(i, j) \quad (5)$$

In the equations, edge_corrosion(i, j) is the whole edge information of pixel at location (i, j) of an image after erosion, edge_expansion(i, j) is the whole edge information of a pixel at location of (i, j) of an image after dilation, and edge_map(i, j) is relatively accurate whole edge information of a pixel at location of (i, j) of an image output by the edge detector 201.

Similarly, conduct the same dilation and erosion process to the strong edge information. The edge detector 201 outputs strong edge information of stedge_map(i, j) of a pixel at location of (i, j) of an image.

The flat/texture detector 202 of the embodiment of the present invention performs mathematical statistics to brightness value of surrounding pixels of the pixel to be processed. In this method, a brightness mean value µ and a brightness mean absolute deviation MAD of a 3×3 pixel brightness matrix X is calculated to analyze brightness change of the matrix where the pixel to be processed is located, as shown in equations (6) and (7).

$$\mu = \frac{1}{9}\sum_{i=1}^{3}\sum_{j=1}^{3} X(i, j) \quad (6)$$

$$MAD = \frac{1}{9}\sum_{i=1}^{3}\sum_{j=1}^{3} |X(i, j) - \mu| \quad (7)$$

Compare the calculated brightness change value with defined threshold values TEXTURE_HIGH_TH (16), 2·TEXTURE_LOW_TH and TEXTURE_LOW_TH (2), if the brightness mean absolute deviation MAD is relatively large, it represents that the pixel to be processed is in a textural area; if the brightness mean absolute deviation MAD is relatively small, it represents that the pixel to be processed is in a flat area.

$$\text{texture\_map}(i, j) = \begin{cases} 3, & \text{if } MAD \geq \text{TEXTURE\_HIGH\_TH} \\ 2, & \text{else if } MAD \geq 2\cdot\text{TEXTURE\_LOW\_TH} \\ 1, & \text{else if } MAD \geq \text{TEXTURE\_LOW\_TH} \\ 0, & \text{others} \end{cases} \quad (8)$$

In the equation, texture_map(i, j) represents a textural degree of a pixel at location (i, j) of an image, the smaller the value represents that the pixel to be processed is located in even flatter area.

Figure 5:
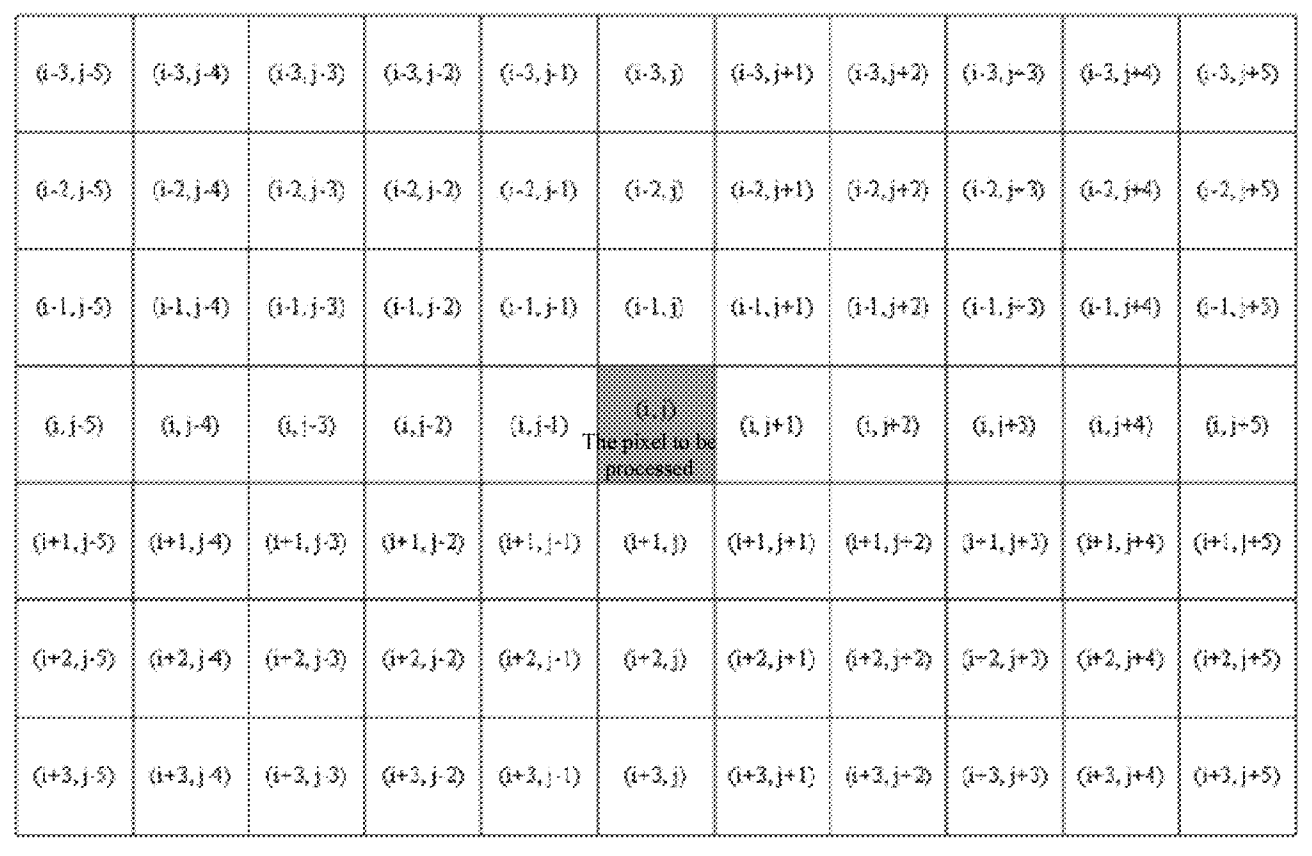

FIG. 5 shows a method for implementing the ringing artifact area locator 203 in the embodiment 200 of the present invention. The method conducts an overall analysis to the above obtained edge information and flat/textural information in a 7×11 window, so as to judge whether the pixel to be processed is located in a ringing artifact area and to determine the degree of significance, as shown in equation (9).

$$\text{ring\_map}(i, j) = \begin{cases} 3, & \text{if } [\text{edge\_map}(i, j) = 1]||[\text{texture\_map}(i, j) = 2] \\ 2, & \text{else if } \sum_{s=-3}^{3}\sum_{t=-3}^{3} \text{stedge\_map}(i+s, j+t) \geq 3 \\ 1, & \text{else if } \sum_{s=-3}^{3}\sum_{t=-5}^{5} \text{edge\_map}(i+s, j+t) \geq 5 \\ 0, & \text{others} \end{cases} \quad (9)$$

In the equation, ring_map(i, j) represents the ringing artifact condition of a pixel at location of (i, j) of an image: if ring_map(i, j) is equal to 3, it represents that the pixel to be processed is located at the edge or a textural area, which is required to be retained instead of being filtered; if ring_map(i, j) is equal to 2, it represents that the pixel to be processed is close to a strong edge, since the ringing artifact is more serious when close to the strong edge, thus a stronger filtering method is required to suppress the ringing artifact; if ring_map(i, j) is equal to 1, it represents that a pixel to be processed is close to a weak edge, a weaker filtering method is required to suppress the ringing artifact; and if ring_map(i, j) is equal to 0, it represents that a pixel to be processed is not a pixel having ringing artifact, the suppression of ringing artifact is not required.

Figure 6:
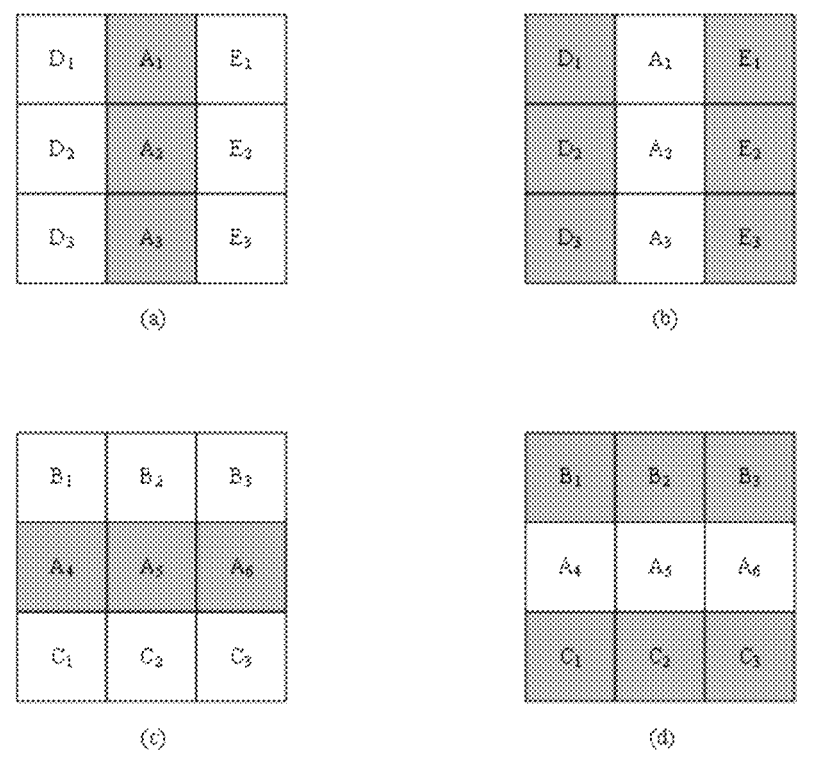

FIG. 6 shows a method for implementing single-pixel line detection by the line detector 204 of the embodiment 200 of the present invention. Taking a single-pixel line in a vertical direction as an example, when the conditions as shown in FIG. 6(*a*) and FIG. 6(*b*) are satisfied, i.e., the pixels $A_1$, $A_2$ and $A_3$ in continuous three rows are simultaneously and respectively smaller or greater than $D_1$ and $E_1$, $D_2$ and $E_2$, and $D_3$ and $E_3$ with LINE_TH1, and the difference between the maximum value and the minimum value of $A_1$, $A_2$, and $A_3$ is smaller than LINE_TH2, then the pixel at the present location is located in a vertical single-pixel line, vline_map (i, j) is labeled as 1. Likewise, when the conditions shown in FIG. 6(*c*) and FIG. 6(*d*) are satisfied, i.e., the pixels $A_4$, $A_5$ and $A_6$ in continuous three rows are simultaneously and respectively smaller or greater than $B_1$ and $C_1$, $B_2$ and $C_2$, and $B_3$ and $C_3$ with LINE_TH1, the difference between the maximum value and the minimum value of $A_4$, $A_5$ and $A_6$ is smaller than LINE_TH2, the pixel at the present location is located in a horizontal single-pixel line, hline_map(i, j) is labeled as 1. In the embodiment of the present invention, both threshold values LINE_TH1 and LINE_TH2 are defined as 2. A final output line_map(i, j) of the line detector 204 is obtained from equation (10).

$$\text{line\_map}(i, j) = \text{vline\_map}(i, j) || \text{hline\_map}(i, j) \quad (10)$$

Figure 7A:
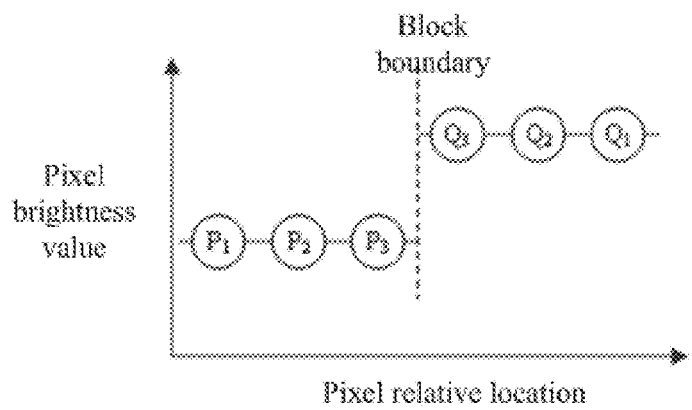
FIG. 7($a$) and FIG. 7($b$) are schematic diagrams of a method for detecting the block boundary in embodiments of the present invention, FIG. 7($a$) shows an assumed brightness relationship between six adjacent pixels $P_1$, $P_2$, $P_3$, $Q_3$, $Q_2$ and $Q_1$ which are perpendicular to the block boundary.

FIG. 7 shows a method of the block boundary detector 205 of embodiment 200 of the present invention. Taking a vertical block boundary as an example, FIG. 7(*a*) shows a brightness relationship between six assumed adjacent pixels $P_1$, $P_2$, $P_3$, $Q_3$, $Q_2$ and $Q_1$ close to the block boundary: a brightness jumping change of a certain extent exists between $P_3$ and $Q_3$ locating at the left-side and right-side of the block boundary with blocking artifact, whereas brightness change between the adjacent pixels locating at the left-side and right-side of the block boundary a relatively small. According to this feature of block boundary, the embodiment of the present invention determines whether the present pixel is located at the block boundary by observing gradient changes between adjacent pixels, and determines the strength of block boundary by observing the jumping change of pixels $P_3$ and $Q_3$ at both sides of block boundary. If $P_1$, $P_2$, $P_3$, $Q_3$, $Q_2$ and $Q_1$ simultaneously satisfy the three conditions of equation (11), a vertical block boundary may exist between pixels $P_3$ and $Q_3$.

Condition1: BLK_MID_TH<$D_3$<BLK_HIGH_TH;

Condition2: max($D_1$, $D_2$, $D_4$, $D_5$)<BLK_LOW_TH;

Condition3: $D_3$>max($D_1$, $D_2$, $D_4$, $D_5$). (11)

In the equations, $D_1$, $D_2$, $D_3$, $D_4$ and $D_5$ respectively represent $|P_1-P_2|$, $|P_2-P_3|$, $|P_3-Q_3|$, $|Q_3-Q_2|$ and $|Q_2-Q_1|$. BLK_LOW_TH (2), BLK_MID_TH (1) and BLK_HIGH_TH (15) are defined experience threshold values.

Figure 7B:
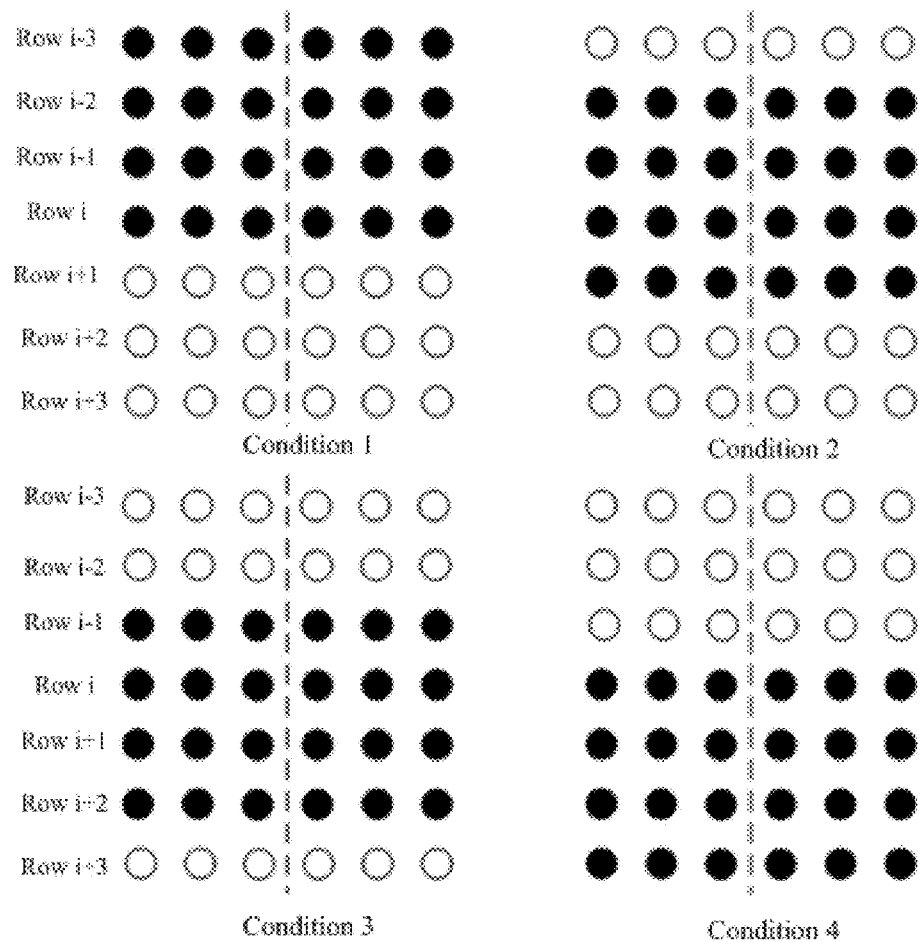

Based on the above, the embodiment of the present invention adopts four conditions of FIG. 7(b) to determine whether blocking artifact exists between $P_3$ and $Q_3$. The row i of FIG. 7(b) denotes the present row, the dotted line denotes an assumed location of a vertical block boundary, and the gray area are four continuous rows satisfying the conditions. In a 7×6 window, according to the continuity of the block boundary in a vertical direction, only if at least four continuous rows satisfy the three conditions of equation (53) and satisfy that $P_3-Q_3$ at least in four continuous rows has the same mathematical symbol, then it represents that the pixel to be processed is located at a vertical block boundary with blocking artifact. After detecting the location information of block boundary with blocking artifact, determine the strength of block boundary according to equation (12) to control the strength of the following filtering process. The detection result vbd_map(i, j) of block boundary in the vertical direction is shown in equation (12), where $P_3$ corresponds to a location of (i, j) in an image.

$$\text{vbd\_map}(i, j) = \begin{cases} 2, & \text{if } |P_3 - Q_3| > 5 \cdot \text{BLK\_MID\_TH} \\ 1, & \text{else if } |P_3 - Q_3| > \text{BLK\_MID\_TH} \\ 0, & \text{others} \end{cases} \quad (12)$$

The method for detecting horizontal block boundary is similar that a 6×7 window is taken as the candidate pixel matrix. Taking the similar detection method, finally a detection result of hbd_map(i, j) of a horizontal block boundary is obtained.

In combination with the vertical and horizontal block boundary information, finally whole block boundary information bd_map(i, j) and strong block boundary information stbd_map(i, j) is obtained as the output of the block boundary detector 205.

$$\text{stbd\_map}(i, j) = \qquad (13)$$
$$\begin{cases} 1, & \text{if } [\text{vbd\_map}(i, j) == 2] || [\text{hbd\_map}(i, j) == 2] \\ 0, & \text{others} \end{cases}$$

$$\text{bd\_map}(i, j) = \begin{cases} 1, & \text{if } [\text{vbd\_map}(i, j) \neq 0] || [\text{hbd\_map}(i, j) \neq 0] \\ 0, & \text{others} \end{cases} \quad (14)$$

Figure 8:
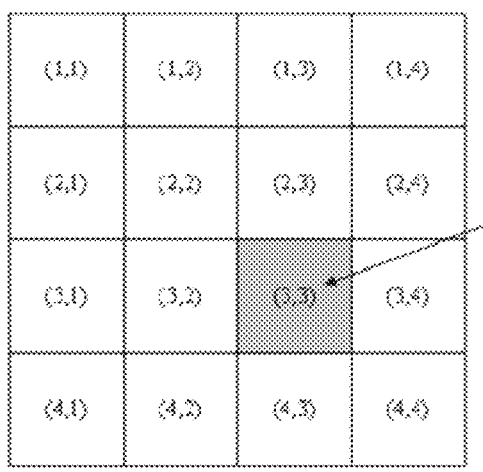
FIG. 8 is a 4×4 window used for locating the blocking artifact filtering area, (3,3) refers to the location of the pixel to be processed.

The blocking artifact filtering area locator 206 of embodiment 200 of the present invention, on the basis of the block boundary information bd_map(i, j) obtained from the block boundary detector 205, locates an area required to be filtered at a block boundary and its surroundings. Since a pixel on left-side or upper-sides of a block boundary is labeled during block boundary detection, the blocking artifact filtering area locator 206 uses a 4×4 window with the third row and the third column defined as the location of the pixel to be processed so as to locate a blocking artifact filtering area and to quantify the severity of the blocking artifact, as shown in FIG. 8. The location process is shown in equation (15).

$$\text{blk\_map}(i, j) = \qquad (15)$$
$$\begin{cases} 3, & \text{if } \sum_{s=-2}^{1}\sum_{t=-2}^{1} \text{stbd\_map}(i+s, j+t) \geq 1 \\ 2, & \text{else if } \sum_{s=-2}^{1}\sum_{t=-2}^{1} \text{bd\_map}(i+s, j+t) \geq 1 \\ 1, & \text{else if } [\text{texture\_map}(i, j) == 0] \&\& [\sim \text{line\_map}(i, j)] \\ 0, & \text{others} \end{cases}$$

The blocking artifact suppressing filtering enable judge 207 in embodiment 200 of the present invention counts non-zero conditions, in the present frame, of block boundary information bd_map(i, j) that obtained from the above detection process, and calculates the percentage of the counting result of pixels in a whole frame of an image, denoted as ratio. According to the degree of severity of the blocking artifact, output blocking artifact suppressing filtering enable deblk_glen$_N$ with different strengths for use in a next frame.

$$\text{deblk\_glen}_N = \begin{cases} 2, & \text{if ratio} > \text{TH\_BLK\_RATIO2} \\ 1, & \text{else if ratio} > \text{TH\_BLK\_RATIO1} \\ 0, & \text{others} \end{cases} \quad (16)$$

In the equation, TH_BLK_RATIO1 (1/64) and TH_BLK_RATIO2 (23/512) are defined experience percentage threshold values. If deblk_glen$_N$ is equal to 2, it represents that a video image has a relatively serious blocking artifact; if deblk_glen$_N$ is equal to 1, it represents that a video image has a relatively obvious blocking artifact that requires a blocking artifact suppressing process; if deblk_glen$_N$ is equal to 0, it represents that a video image does not have blocking artifact or has a non-obvious blocking artifact which does not require a blocking artifact suppressing process.

In the adaptive mean filter 208 of embodiment 200 of the present invention, an adaptive mean filter is used for suppressing the ringing artifact and blocking artifact, the brightness filtering result is shown in equation (17).

$$y'(i, j) = \frac{\sum_{s=-\frac{M-1}{2}}^{\frac{M-1}{2}} \sum_{t=-\frac{N-1}{2}}^{\frac{N-1}{2}} \omega(i+s, j+t) \cdot y(i+s, j+t)}{\sum_{s=-\frac{M-1}{2}}^{\frac{M-1}{2}} \sum_{t=-\frac{N-1}{2}}^{\frac{N-1}{2}} \omega(i+s, j+t)} \quad (17)$$

$$\omega(i+s, j+t) = \begin{cases} 1, & \text{if } |y(i+s, j+t) - y(i, j)| < \text{filter\_th} \\ 0, & \text{others} \end{cases} \quad (18)$$

In the equations, y(i, j) is the brightness of the present pixel to be processed; y'(i, j) is a brightness filtering result using a M×N window with y(i, j) as a central pixel during filtering; y(i+s, j+t) is a brightness value of a pixel at the location of (i+s, j+t) within a M×N window; ω(i+s, j+t) is the weight corresponding to the pixel y(i+s, j+t); and filter_th is an adaptive filtering threshold value obtained from equation (19).

$$\text{filter\_th} = \begin{cases} \alpha_1 \cdot y(i,j), & \text{A strong filtering for suppressing ringing noise} \\ \min[\text{FILTER\_TH1}, \alpha_2 \cdot y(i,j)], & \text{A weak filtering for suppressing ringing noise} \\ \text{FILTER\_TH2}, & \text{A strong filtering for suppressing blocking effect} \\ \text{FILTER\_TH3}, & \text{A weak filtering for suppressing blocking effect} \\ \text{FILTER\_TH4}, & \text{A flat area filtering for suppressing blocking effect} \end{cases} \quad (19)$$

In the equation, $\alpha_1$ and $\alpha_2$ are threshold adjusting coefficients that are independently defined to be ⅛ and 3/32 in this embodiment; and FILTER_TH1, FILTER_TH2, FILTER_TH3 and FILTER_TH4 take the values of 6, 15, 8 and 4.

The adaptive filter 208 of this embodiment, according to the different threshold values of filter_th, outputs five types of filtering results that respectively indicated as a strong filtering result $y_{stdr}(i,j)$ and a weak filtering result $y_{wkdr}(i,j)$ for suppressing the ringing artifact, a strong filtering result $y_{stdb}(i,j)$ and a weak filtering result $y_{wkdb}(i,j)$ for suppressing blocking artifact, and a supplementary filtering result $y_{flatdb}(i,j)$ in a flat area. The filtering process of this embodiment uses a 5×7 window.

The filtering selector 209 of the embodiment 200 of the present invention, according to the information of ring_map(i, j) and blk_map(i, j) obtained from the above, retains the weak single-pixel lines in the edge, texture and flat area; next, according to the area where the pixel to be processed is located and the artifact strength, and the blocking artifact suppressing filtering enable deblk_glen$_{N-1}$ obtained from the previous frame, select appropriate results from y(i, j), $y_{stdr}(i,j)$, $y_{wkdr}(i,j)$, $y_{stdb}(i,j)$, $y_{wkdb}(i,j)$ and $y_{flatdb}(i,j)$ as final filtering result $y_{filtered}(i,j)$ that is to be output from the filtering selector 209. The specific selection process is shown in equation (20).

$$\lambda = \begin{cases} \dfrac{1}{2}, & \text{if } \left[\displaystyle\sum_{s=-2}^{2}\sum_{t=-2}^{2} \omega'(i+s, j+t)\right] \geq 21 \\ \dfrac{1}{4}, & \text{else if } \left[\displaystyle\sum_{s=-2}^{2}\sum_{t=-2}^{2} \omega'(i+s, j+t)\right] \geq 16 \\ 0, & \text{others} \end{cases} \quad (22)$$

$$\omega'(i+s, j+t) = \begin{cases} 1, & \text{if } |y(i+s, j+t) - y(i,j)| \leq \text{BLEND\_TH} \\ 0, & \text{others} \end{cases} \quad (23)$$

In the equations, $\omega'(i+s, j+t)$ represents brightness differences between a central pixel and other pixels within a 5×5 window with pixel (i, j) being a central pixel, and the threshold value BLEND_TH is defined to be 3.

In summary, embodiment 200 of the present invention can effectively suppress the ringing artifact and blocking artifact, and meanwhile well protect important original information such as edge and textural information.

What is claimed is:

1. A system for adaptively compensating distortion caused by video compression, comprising: an edge detector (201), a flat/texture detector (202), a ringing artifact area locator (203), a line detector (204), a block boundary detector (205), a blocking artifact filtering area locator (206), a blocking $$y_{filtered}(i,j) = \begin{cases} y(i,j), & \text{if ring\_map}(i,j) == 3 \\ y_{stdr}(i,j), & \text{else if ring\_map}(i,j) == 2 \\ y_{wkdr}(i,j), & \text{else if ring\_map}(i,j) == 1 \\ y_{stdb}(i,j), & \text{else if } [\text{blk\_map}(i,j) == 3] \&\& [\text{deblk\_glen}_{N-1} == 1] \\ y_{wkdb}(i,j), & \text{else if } \{[\text{blk\_map}(i,j) == 2] \&\& [\text{deblk\_glen}_{N-1} == 1]\} || \\ & \quad \{[\text{texture\_map}(i,j) \leq 1] \&\& \text{deblk\_glen}_{N-1} == 2\} \\ y_{flatdb}(i,j), & \text{else if blk\_map}(i,j) == 1 \\ y(i,j), & \text{others} \end{cases} \quad (20)$$

For better preventing an excessive filtering, embodiment 200 of the present invention uses a weights sum of the original brightness value of the pixel to be processed and the filtering result before finally output the result. The value of weight coefficients is adaptively obtained according to the degree of difference between the pixel to be processed and its surrounding pixels for better preserving an original image. All of these are completed in the output fusion 210.

$$y_{out}(i,j) = \lambda \cdot y(i,j) + (1-\lambda) \cdot y_{filtered}(i,j) \quad (21)$$

In the equation, $y_{out}(i,j)$ is a final brightness output and $\lambda$ is fusion weights coefficient. The value of $\lambda$ is calculated from equations (22) and (23).

artifact suppressing enable judge (207), an adaptive mean filter (208), a filtering selector (209) and an output fusion (210);

wherein input ends of the edge detector (201), the flat/texture detector (202), the line detector (204), the block boundary detector (205), the adaptive mean filter (208), the filtering selector (209) and an output fusion (210) are connected to a video image input port; output ends of the edge detector (201) and the flat/texture detector (202) are connected to an input end of the ringing artifact area locator (203); an output end of the line detector (204) is connected to an input end of the blocking artifact filtering area locator (206); an output end of the block boundary detector (205) is connected to the input end of the blocking artifact filtering area locator (206) and an input end of the blocking artifact suppressing enable judge (207); output ends of the ringing artifact area locator (203), the blocking artifact filtering area locator (206) and the adaptive mean filter (208) are connected to the input end of the filtering selector (209); and an output end of the filtering selector (209) is connected to the input end of the output fusion (210), wherein the edge detector (201) uses gradient operators $A_v$, $A_h$, $A_r$ and $A_l$ of four directions in Sobel edge detection, and calculates gradient values $G_v$, $G_h$, $G_r$ and $G_l$ of the four directions in combination with a 3×3 brightness matrix X, and then takes the maximum value from gradient absolute value as $G_{max}$, compares, respectively, with threshold values SOBEL_HIGH_TH and SOBEL_LOW_TH, and classifies image pixels to obtain whole edge information and a strong edge information, as shown in equations (1) and (2):

$$G_{max} = \max(|G_h|, |G_v|, |G_r|, |G_l|) \quad (1)$$

$$\text{edge\_tmp}(i, j) = (G_{max} > \text{SOBEL\_LOW\_TH}) ? 1 : 0$$

$$\text{stedge\_tmp}(i, j) = (G_{max} > \text{SOBEL\_HIGH\_TH}) ? 1 : 0 \quad (2)$$

in the equations, edge_tmp(i,j) and stedge_tmp(i,j) are the whole edge information and the strong edge information of a pixel at location (i,j) of an image respectively; and the threshold values SOBEL_HIGH_TH and SOBEL_LOW_TH are 270 and 65, respectively;

the edge detector (201) further conducts erosion and dilation to the result obtained from the Sobel edge detection, and the specific erosion and dilation process is shown in equations (3) and (4), and the final output of the whole edge information by the edge detector 201 is as shown in equation (5):

$$\text{edge\_corrosion}(i, j) = \quad (3)$$
$$\text{edge\_tmp}(i, j) \,\&\&\, \left( \sum_{s=-1}^{1} \sum_{t=-1}^{1} \text{edge\_tmp}(i+s, j+t) \geq 3 \right)$$

$$\text{edge\_expansion}(i, j) = [!\,\text{edge\_tmp}(i, j)] \,\&\& \quad (4)$$
$$\{[\text{edge\_tmp}(i-1, j-1) \,\&\&\, \text{edge\_tmp}(i+1, j+1)]$$
$$||[\text{edge\_tmp}(i, j-1) \,\&\&\, \text{edge\_tmp}(i, j+1)]$$
$$||[\text{edge\_tmp}(i+1, j+1) \,\&\&\, \text{edge\_tmp}(i-1, j+1)]$$
$$||[\text{edge\_tmp}(i-1, j) \,\&\&\, \text{edge\_tmp}(i+1, j)]\}$$

$$\text{edge\_map}(i, j) = \text{edge\_corriosion}(i, j) || \text{edge\_expansion}(i, j) \quad (5)$$

in the equations, edge_corrosion(i,j) is the whole edge information of a pixel at location of (i,j) of an image after erosion, and edge_expansion(i, j) is the whole edge information of the pixel at location of (i, j) of the image after dilation, and edge_map(i,j) is relatively accurate whole edge information of the pixel at location of (i,j) of the image output by the edge detector 201;

the edge detector 201 conducts the same dilation and erosion process to the strong edge information, outputs strong edge information of stedge_map(i, j) of the pixel at location of (i,j);

the flat/textural detector (202) performs mathematical statistics to brightness value of surrounding pixels of the pixel to be processed, calculates a brightness mean value μ and a brightness absolute deviation MAD of a 3×3 pixel brightness matrix to analyze brightness change of the matrix where the pixel to be processed is located, as shown in equations (6) and (7):

$$\mu = \frac{1}{9} \sum_{i=1}^{3} \sum_{j=1}^{3} X(i, j) \quad (6)$$

$$MAD = \frac{1}{9} \sum_{i=1}^{3} \sum_{j=1}^{3} |X(i, j) - \mu| \quad (7)$$

compare the calculated brightness change value with defined threshold values TEXTURE_HIGH_TH, 2·TEXTURE_LOW_TH and TEXTURE_LOW_TH:

$$\text{texture\_map}(i, j) = \begin{cases} 3, & \text{if } MAD \geq \text{TEXTURE\_HIGH\_TH} \\ 2, & \text{else if } MAD \geq 2 \cdot \text{TEXTURE\_LOW\_TH} \\ 1, & \text{else if } MAD \geq \text{TEXTURE\_LOW\_TH} \\ 0, & \text{others} \end{cases} \quad (8)$$

in the equation, texture_map(i, j) represents a textural degree of a pixel at location of (i,j) of an image, the smaller the value represents that the pixel to be processed is located in even flatter area; the threshold values TEXTURE_HIGH_TH and TEXTURE_LOW_TH take values of 16 and 2;

the ringing artifact area locator (203) conducts an overall analysis to the above obtained edge information and flat/texture information in a 7×11 window, so as to judge whether the pixel to be processed is located in a ringing artifact area and to determine the degree of significance, as shown in equation (9):

$$\text{ring\_map}(i, j) = \quad (9)$$
$$\begin{cases} 3, & \text{if } [\text{edge\_map}(i, j) == 1] || [\text{texture\_map}(i, j) == 2] \\ 2, & \text{else if } \sum_{s=-3}^{3} \sum_{t=-3}^{3} \text{stedge\_map}(i+s, j+t) \geq 3 \\ 1, & \text{else if } \sum_{s=-3}^{3} \sum_{t=-5}^{5} \text{edge\_map}(i+s, j+t) \geq 5 \\ 0, & \text{others} \end{cases}$$

in the equation, ring_map(i, j) represents the ringing artifact condition of a pixel at location of (i, j) of an image: if ring_map(i, j) is equal to 3, it represents that the pixel to be processed is located at the edge or a textural area, which is required to be retained instead of being filtered; if ring_map(i, j) is equal to 2, it represents that the pixel to be processed is close to a strong edge, since the ringing artifact is more serious when close to the strong edge, thus a stronger filtering method is required to suppress the ringing artifact; if ring_map(i, j) is equal to 1, it represents that a pixel to be processed is close to a weak edge, a weaker filtering method is required to suppress the ringing artifact; and if ring_map(i, j) is equal to 0, it represents that a pixel to be processed is not a pixel having ringing artifact, the suppression of ringing artifact is not required;

the method of detecting single-pixel line by the line detector 204 comprises: in a vertical direction, when satisfyingthe conditions that the pixels $A_1$, $A_2$ and $A_3$ in three continuous rows are simultaneously and respectively smaller or greater than $D_1$ and $E_1$, $D_2$ and $E_2$, and $D_3$ and $E_3$ with LINE_TH1, and the difference between the maximum value and the minimum value of $A_1$, $A_2$, and $A_3$ is smaller than LINE_TH2, then the pixel at the present location is located in a vertical single-pixel line, vline_map(i, j) is labeled as 1; likewise, when satisfying the conditions that the pixels $A_4$, $A_5$ and $A_6$ in three continuous rows are simultaneously and respectively smaller or greater than $B_1$ and $C_1$, $B_2$ and $C_2$, and $B_3$ and $C_3$ with LINE_TH1, the difference between the maximum value and the minimum value of $A_4$, $A_5$ and $A_6$ is smaller than LINE_TH2, the pixel at the present location is located in a horizontal single-pixel line, hline_map(i, j) is labeled as 1; both threshold values LINE_TH1 and $LINE_{13}$ TH2 are defined as 2; a final output $line_{13}$ map(i, j) of the line detector 204 is obtained from equation (10):

$$line\_map(i, j) = vline\_map(i, j) || hline\_map(i, j) \quad (10)$$

a method of detecting block boundary by the block boundary detector (205) comprises: for a vertical block boundary, when the brightness relationship between six assumed adjacent pixels $P_1$, $P_2$, $P_3$, $Q_3$, $Q_2$ and $Q_1$ close to the block boundary simultaneously satisfy three conditions of equation (11), a vertical block boundary may exist between pixels $P_3$ and $Q_3$:

Condition1: BLK_MID_TH<$D_3$<BLK_HIGH_TH;

Condition2: max($D_1$, $D_2$, $D_4$, $D_5$)<BLK_LOW_TH; (11)

Condition3: $D_3$>max($D_1$, $D_2$, $D_4$, $D_5$);

in the equations, $D_1$, $D_2$, $D_3$, $D_4$ and $D_5$ respectively represents $|P_1-P_2|$, $|P_2-P_3|$, $|P_3-Q_3|$, $|Q_3-Q_2|$ and $|Q_2-Q_1|$, BLK_LOW_TH, BLK_MID_TH and BLK_HIGH_TH take values of 2, 1 and 15:

in a 7×6 window, according to the continuity of the block boundary in a vertical direction, only if at least four continuous rows satisfy the three conditions of equation (11) and satisfy that $P_3$-$Q_3$ at least in the four continuous rows has the same mathematical symbol, then it represents that the pixel to be processed is located at a vertical block boundary with blocking artifact; after detecting the location information of block boundary with blocking artifact, determine the strength of block boundary according to equation (12), the detection result vbd_map(i, j) of block boundary in the vertical direction is shown in equation (12), wherein $P_3$ corresponds to a location of (i, j) in an image:

$$vbd\_map(i, j) = \begin{cases} 2, & \text{if } |P_3 - Q_3| > 5 \cdot BLK\_MID\_TH \\ 1, & \text{else if } |P_3 - Q_3| > BLK\_MID\_TH \\ 0, & \text{others} \end{cases} \quad (12)$$

a 6×7 window is taken as the candidate pixel matrix, and conduct a method for detecting a horizontal block boundary, which is similar to the method for detecting a vertical block boundary, and finally obtains a detection result of hbd_map(i, j) of a horizontal block boundary;

in combination with the vertical and horizontal boundary information, finally whole block boundary information bd_map(i, j) and strong block boundary information stbd_map(i, j) is obtained as the output of block boundary detector 205:

$$stbd\_map(i, j) = \begin{cases} 1, & \text{if } [vbd\_map(i, j) == 2] || [hbd\_map(i, j) == 2] \\ 0, & \text{others} \end{cases} \quad (13)$$

$$bd\_map(i, j) = \begin{cases} 1, & \text{if } [vbd\_map(i, j) \neq 0] || [hbd\_map(i, j) \neq 0] \\ 0, & \text{others} \end{cases} \quad (14)$$

the blocking artifact filtering area locator (206), on the basis of the block boundary information bd_map(i, j) obtained from the block boundary detector (205), locates an area required to be filtered at a block boundary and its surroundings; the blocking artifact filtering area locator (206) uses the third row and the third column as a 4×4 window of the pixel to be processed so as to locate a blocking artifact filtering area and to quantify the severity of the blocking artifact, the location process is shown in equation (15):

$$blk\_map(i, j) = \quad (15)$$

$$\begin{cases} 3, & \text{if } \sum_{s=-2}^{1}\sum_{t=-2}^{1} stbd\_map(i+s, j+t) \geq 1 \\ 2, & \text{else if } \sum_{s=-2}^{1}\sum_{t=-2}^{1} bd\_map(i+s, j+t) \geq 1 \\ 1, & \text{else if } [texture\_map(i, j) == 0] \&\& [\sim line\_map(i, j)] \\ 0, & \text{others} \end{cases}$$

the blocking artifact suppressing filtering enable judge (207) counts non-zero conditions in the present frame of block boundary information bd_map(i, j) that obtained from the above detection process, and calculates the ratio of the counting result to the pixels in a whole frame of the image, denoted as ratio; according to the degree of severity of the blocking artifact, output blocking artifact suppressing filtering enable deblk_$glen_N$, with different strengths for use in a next frame;

$$deblk\_glen_N = \begin{cases} 2, & \text{if ratio} > TH\_BLK\_RATIO2 \\ 1, & \text{else if ratio} > TH\_BLK\_RATIO1 \\ 0, & \text{others} \end{cases} \quad (16)$$

in the equation, TH_BLK_RATIO1 and TH_BLK_RATIO2 take values of 1/64 and 23/512; if deblk_$glen_N$, is equal to 2, it represents that a video image has a relatively serious blocking artifact; if deblk_$glen_N$, is equal to 1, it represents that a video image has a relatively obvious blocking artifact that requires a blocking artifact suppressing process; if deblk_$glen_N$, is equal to 0, it represents that a video image does not have blocking artifact or has a non-obvious blocking artifact which does not require a blocking artifact suppressing process;

adaptive mean filter (208) has a brightness filtering result shown in equation (17):

$$y'(i, j) = \frac{\sum_{s=-\frac{M-1}{2}}^{\frac{M-1}{2}}\sum_{t=-\frac{N-1}{2}}^{\frac{N-1}{2}} \omega(i+s, j+t) \cdot y(i+s, j+t)}{\sum_{s=-\frac{M-1}{2}}^{\frac{M-1}{2}}\sum_{t=-\frac{N-1}{2}}^{\frac{N-1}{2}} \omega(i+s, j+t)} \quad (17)$$

$$\omega(i+s, j+t) = \begin{cases} 1, & \text{if } |y(i+s, j+t) - y(i, j)| < filter\_th \\ 0, & \text{others} \end{cases} \quad (18)$$

in the equations, y(i, j) is the brightness of the present pixel to be processed; y'(i, j) is a brightness filtering result using a M×N window with y(i, j) as the central pixel during filtering; y(i+s, j+t) is a brightness value of a pixel at the location of (i+s, j+t) within a M×N window, ω(i+s, j+t) is a weight corresponding to the pixel y(i+s, j+t): and filter_th is an adaptive filtering threshold value obtained from equation (19):

$$\text{filter\_th} = \begin{cases} \alpha_1 \cdot y(i,j), & \text{a strong filtering for suppressing ringing noise} \\ \min[\text{FILTER\_TH1}, \alpha_2 \cdot y(i,j)], & \text{a weak filtering for suppressing ringing noise} \\ \text{FILTER\_TH2}, & \text{a strong filtering for suppressing blocking effect} \\ \text{FILTER\_TH3}, & \text{a weak filtering for suppressing blocking effect} \\ \text{FILTER\_TH4}, & \text{a flat area filtering for suppressing blocking effect} \end{cases} \quad (19)$$

in the equation, $\alpha_1$ and $\alpha_2$ are threshold adjusting coefficients that are independently defined to be ⅛ and 3/32: FILTER_TH1, FILTER_TH2, FILTER_TH3 and FILTER_TH4 respectively take values of 6, 15, 8 and 4:

the adaptive filter (208), according to the different threshold values of filter_th, outputs five types of filtering results to the filtering selector (209) hat respectively indicated as a strong filtering result $y_{stdr}(i,j)$ and a weak filtering result $y_{wkdr}(i,j)$ for suppressing the ringing artifact, a strong filtering result $Y_{stdb}(i,j)$ and a weak filtering result $y_{wkdb}(i,j)$ for suppressing blocking artifact, and a supplementary filtering result $y_{flatdb}(i,j)$ in a flat area;

the filtering selector (209), according to the information ring_map(i, j) and blk_map(i, j) obtained from above, retains weak single pixel lines in the edge, texture and the flat area; next, according to the area where the pixel to be processed is located and the artifact strength, and the blocking artifact suppressing filtering enable deblk_glen$_{N-1}$ obtained from the previous frame select appropriate results from y(i, j), $y_{stdr}(i,j)$, $y_{wkdr}(i,j)$, $y_{stdb}(i,j)$, $y_{wkdb}(i,j)$ and $y_{flatdb}(i,j)$ as final filtering result $y_{filtered}(i,j)$ and output from the filtering selector 209;
the specific selection process is shown in equation (20):

$$y_{filtered}(i,j) = \begin{cases} y(i,j), & \text{if } \text{ring\_map}(i,j) == 3 \\ y_{stdr}(i,j), & \text{else if } \text{ring\_map}(i,j) == 2 \\ y_{wkdr}(i,j), & \text{else if } \text{ring\_map}(i,j) == 1 \\ y_{stdb}(i,j), & \text{else if } [\text{blk\_map}(i,j) == 3] \,\&\&\, [\text{deblk\_glen}_{N-1} == 1] \\ y_{wkdb}(i,j), & \text{else if } \{[\text{blk\_map}(i,j) == 2]\,\&\&\, [\text{deblk\_glen}_{N-1} == 1]\} \,||\, \\ & \{[\text{texture\_map}(i,j) \leq 1] \,\&\&\, \text{deblk\_glen}_{N-1} == 2\} \\ y_{flatdb}(i,j), & \text{else if } \text{blk\_map}(i,j) == 1 \\ y(i,j), & \text{others} \end{cases} \quad (20)$$

the output fusion (210) conducts a weight sum of the original brightness value of the pixel to be processed and the filtering results from the filtering selector (209); the details is shown in equation (21):

$$y_{out}(i,j) = \lambda \cdot y(i,j) + (1-\lambda) \cdot y_{filtered}(i,j) \quad (21)$$

in the equation, $y_{out}(i,j)$ is a final brightness output and $\lambda$, is fusion weights coefficient; the value of $\lambda$ is calculated from equations (22) and (23):

$$\lambda = \begin{cases} \dfrac{1}{2}, & \text{if } \left[\sum_{s=-2}^{2}\sum_{t=-2}^{2} \omega'(i+s, j+t)\right] \geq 21 \\ \dfrac{1}{4}, & \text{else if } \left[\sum_{s=-2}^{2}\sum_{t=-2}^{2} \omega'(i+s, j+t)\right] \geq 16 \\ 0, & \text{others} \end{cases} \quad (22)$$

$$\omega'(i+s, j+t) = \begin{cases} 1, & \text{if } |y(i+s, j+t) - y(i,j)| \leq \text{BLEND\_TH} \\ 0, & \text{others} \end{cases} \quad (23)$$

in the equation, ω'(i+s, j+t) represents brightness differences between a central pixel and other pixels within a 5×5 window with pixel (i, j) being a central pixel, and the threshold value BLEND_TH is defined to be 3.

2. The system for adaptively compensating distortion caused by video compression according to claim 1, wherein:
the edge detector (201) is configured to obtain edge and strength information of an input video image;
the flat/texture detector (202) is configured to obtain flat/textural information of the input video image;
the line detector (204) is configured to facilitate detecting and retaining of weak single-pixel lines;
the block boundary detector (205) is configured to detect location and strength information of a block boundary having blocking artifact in the input video image;
the ringing artifact area locator (203) is configured to locate a ringing artifact prone area and label filtering strength thereof, according to the edge information and the flat/textural information;
the blocking artifact filtering area locator (206) is configured to locate the blocking artifact filtering area and label the filtering strength, according to the edge information, the flat/textural information, single pixel line information and block boundary information;
the blocking artifact suppressing filtering enable judge (207) is configured to calculate a ratio of block boundary in the present frame to the image of the whole frame, turn on the blocking artifact suppressing filtering strength enable when the blocking artifact exceeds the threshold value, for use in the next frame;
the adaptive mean filter (208) is configured to generate results of filtering with different strengths;
the filtering selector (209) is configured to select corresponding filtering results from the results of the original input video image and the adaptive mean filter (208), according to the results from the ringing artifact area locator (203), the blocking artifact filtering area locator (206) and the blocking artifact suppressing filtering enable obtained from the previous frame; and
the output fusion (210) finally outputs a weighted sum of an original value and the filtering results of the pixel to be possessed of the input video image.

3. The system for adaptively compensating distortion caused by video compression according to claim 1, wherein the edge detector (201) detects edge information of the input video image, and conducts erosion and dilation to obtain edge and strength information; the flat/texture detector (202) obtains flat/textural information of the input video image; the line detector (204) detects single pixel line of the input video image; the block boundary detector (205) detects location and strength information of a block boundary of the input video image with blocking artifact; the ringing artifact area locator (203) locates a ringing artifact prone area and labels required filtering strength according to the edge and flat/texture feature information, after excluding the edges and texture information; the blocking artifact filtering area locator (206) locates the blocking artifact filtering area and labels required filtering strength according to detected block boundary information, after excluding pixels on weak single pixel line of the edge, the texture and the flat area; the blocking artifact suppressing enable judge (207) calculates a ratio of the block boundary in the present frame to the image of the whole frame according to a block boundary result detected by the block boundary detector (205), when the blocking artifact exceeds the threshold value, turns on blocking artifact suppressing filtering strength enable for use in the next frame; the adaptive filter (208) generates adaptive filtering results with different strengths for selection of the filtering selector (209); the filtering selector (209) selects corresponding filtering results from the results of the original input video image and the adaptive mean filter (208), according to the results from the ringing artifact area locator (203), the blocking artifact filtering area locator (206) and the blocking artifact suppressing filtering enable obtained from the previous frame; and the output fusion (210) achieves a weighted sum of an original value of the pixel to be processed and the filtering results.

4. The system for adaptively compensating distortion caused by video compression according to claim 1, wherein, the input ends of the edge detector (201), the flat/texture detector (202), the line detector (204), the block boundary detector (205), the adaptive mean filter (208), the filtering selector (209) and the output fusion (210) are connected to an output end of a video decoder; and an output end of the output fusion (210) is connected to input ends of other video display processors.

5. A method for adaptively compensating distortion caused by video compression, wherein the method comprises the steps of:
  detecting, by an edge detector (201), edge information of an input video image, and conducting erosion and dilation to obtained edge and strength information;
  obtaining, by a flat/texture detector (202), flat/textural information of the input video image;
  detecting, by a line detector (204), single pixel lines of the input video image;
  detecting, by a block boundary detector (205), location and strength information of block boundary of the input video image with blocking artifact;
  locating, by a ringing artifact area locator (203), a ringing artifact prone area and labeling required filtering strength according to the edge and flat/texture feature information, after excluding the edges and texture information;
  locating, by a blocking artifact filtering area locator (206), a blocking artifact filtering area and labeling required filtering strength according to detected block boundary information, after excluding pixels on weak single pixel line of the edge, texture and flat area, according to the detected block boundary information;
  calculating, by a blocking artifact suppressing enable judge (207), a ratio of block boundary of an image in the present frame to the image of a whole frame according to the block boundary result detected by the block boundary detector (205), when a blocking artifact exceeds a threshold value, turning on the blocking artifact suppressing filtering strength enable for use in a next frame;
  generating, by an adaptive filter (208), adaptive filtering results with different strengths for selection of the filtering selector (209);
  selecting, by a filtering selector (209), corresponding filtering results from the results of the original input video image and the adaptive filter(208), according to the results from the ringing artifact area locator (203), the blocking artifact filtering area locator (206) and the blocking artifact suppressing filtering enable obtained from a previous frame; and
  achieving, by the output fusion (210), a weighted sum of an original value of the pixel to be processed and the filtering results.

6. A method for adaptively compensating distortion caused by video compression, comprising the following steps:
  inputting an original video image or a video image decoded by a decoder to input ends of an edge detector (201), a flat/texture detector (202), a line detector (204), a block boundary detector (205), an adaptive mean filter (208), a filtering selector (209) and an output fusion (210);
  adopting, by the edge detector (201), gradient operators $A_v$, $A_h$, $A_r$ and $A_l$ of four directions in Sobel edge detection to calculate gradient values $G_v$, $G_h$, $G_r$ and $G_l$ of the four directions; taking the maximum value of absolute value, denoted as $G_{max}$, comparing, respectively, with threshold values SOBEL_HIGH_TH and SOBEL_LOW_TH, and classifying the image pixels to obtain whole edge information and strong edge information, as shown in equations (1) and (2):

$$G_{max}=\max(|G_h|, |G_v|, |G_r|, |G_l|) \quad (1)$$

$$\text{edge\_tmp}(i, j)=(G_{max}>\text{SOBEL\_LOW\_TH})?1:0$$

$$\text{stedge\_tmp}(i, j)=(G_{max}>\text{SOBEL\_HIGH\_TH})?1:0 \quad (2)$$

in the equations, edge_tmp(i, j) and stedge_tmp(i, j) are the whole edge information and the strong edge information of a pixel at location of (i, j) of an image;
  conducting, by the edge detector 201, erosion and dilation to the result obtained from Sobel edge detection, and the specific erosion and dilation process is shown in equations (3) and (4), and the final output of the whole edge information is shown in equation (5):

$$\text{edge\_corrosion}(i, j) = \quad (3)$$
$$\text{edge\_tmp}(i, j) \,\&\&\, \left(\sum_{s=-1}^{1}\sum_{t=-1}^{1} \text{edge\_tmp}(i+s, j+t) \geq 3\right)$$

$$\begin{aligned}\text{edge\_expansion}(i, j) = [!\,\text{edge\_tmp}(i, j) \,\&\&\, \\ \{[\text{edge\_tmp}(i-1, j-1) \,\&\&\, \text{edge\_tmp}(i+1, j+1))] \,||\, \\ [\text{edge\_tmp}(i, j-1) \,\&\&\, \text{edge\_tmp}(i, j+1)] \,||\, \\ [\text{edge\_tmp}(i+1, j-1) \,\&\&\, \text{edge\_tmp}(i-1, j+1)] \,||\, \\ [\text{edge\_tmp}(i-1, j) \,\&\&\, \text{edge\_tmp}(i+1, j)]\} \end{aligned} \quad (4)$$

$$\text{edge\_map}(i, j) = \text{edge\_corriosion}(i, j) \,||\, \text{edge\_expansion}(i, j) \quad (5)$$

in the equations, edge_corrosion(i, j) is the whole edge information of a pixel at location of (i, j) of an image after erosion, and edge_expansion(i, j) is the whole edge information of the pixel at location of (i, j) of the image after dilation, and edge_map(i, j) represents the relatively accurate whole edge information of the pixel at location of (i, j) output by the edge detector (201);
  conducting, by the edge detector, the same dilation and erosion process to the strong edge, outputting strong edge information of stedge_map(i, j) at location of (i, j);
  performing, by the flat/texture detector (202), mathematical statistics to brightness value of surrounding pixels of the pixel to be processed, calculating a brightness mean value $\mu$ and a brightness absolute deviation MAD of a 3×3 pixel brightness matrix to analyze brightness change of the matrix where the pixel to be processed is located, as shown in equations (6) and (7):

$$\mu = \frac{1}{9}\sum_{i=1}^{3}\sum_{j=1}^{3} X(i, j) \quad (6)$$

$$MAD = \frac{1}{9}\sum_{i=1}^{3}\sum_{j=1}^{3} |X(i, j) - \mu| \quad (7)$$

comparing the calculated brightness change value with defined threshold values TEXTURE_HIGH_TH, 2·TEXTURE_LOW_TH and TEXTURE_LOW_TH:

$$\text{texture\_map}(i, j) = \begin{cases} 3, & \text{if} \quad MAD \geq \text{TEXTURE\_HIGH\_TH} \\ 2, & \text{else if} \quad MAD \geq 2 \cdot \text{TEXTURE\_LOW\_TH} \\ 1, & \text{else if} \quad MAD \geq \text{TEXTURE\_LOW\_TH} \\ 0, & \text{others} \end{cases} \quad (8)$$

in the equation, texture_map(i, j) represents a textural degree of a pixel at location of (i, j) of an image, the smaller the value represents that the pixel to be processed is located in even flatter area; the threshold values TEXTURE_HIGH_TH and TEXTURE_LOW_TH take values of 16 and 2;

conducting, by the ringing artifact area locator 203, an overall analysis to the above obtained edge information and the flat/texture information in a 7×11 window so as to judge whether the pixel to be processed is located in a ringing artifact area and to determine the degree of significance, as shown in equation (9):

$$\text{ring\_map}(i, j) = \quad (9)$$

$$\begin{cases} 3, & \text{if} \quad [\text{edge\_map}(i, j) == 1] \,||\, [\text{texture\_map}(i, j) == 2] \\ 2, & \text{else if} \quad \sum_{s=-3}^{3}\sum_{t=-3}^{3} \text{stedge\_map}(i+s, j+t) \geq 3 \\ 1, & \text{else if} \quad \sum_{s=-3}^{3}\sum_{t=-5}^{5} \text{edge\_map}(i+s, j+t) \geq 5 \\ 0, & \text{others} \end{cases}$$

in the equation, ring_map(i, j) represents the ringing artifact condition of a pixel at location of (i, j) of an image: if ring_map(i, j) is equal to 3, it represents that the pixel to be processed is located at the edge or a textural area, which is required to be retained instead of being filtered; if ring_map(i, j) is equal to 2, it represents that the pixel to be processed is close to a strong edge, since the ringing artifact is more serious when close to the strong edge, thus a stronger filtering method is required to suppress the ringing artifact; if ring_map(i, j) is equal to 1, it represents that a pixel to be processed is close to a weak edge, a weaker filtering method is required to suppress the ringing artifact; and if ring_map(i, j) is equal to 0, it represents that a pixel to be processed is not a pixel having ringing artifact, the suppression of ringing artifact is not required;

the method of detecting single-pixel line by the line detector 204 comprises: in a vertical direction, when satisfying the conditions that the pixels $A_1$, $A_2$ and $A_3$ in three continuous rows are simultaneously and respectively smaller or greater than $D_1$ and $E_1$, $D_2$ and $E_2$, and $D_3$ and $E_3$ with LINE_TH1, and the difference between the maximum value and the minimum value of $A_1$, $A_2$, and $A_3$ is smaller than LINE_TH2, then the pixel at the present location is located in a vertical single-pixel line, vline_map(i, j) is labeled as 1; likewise, when satisfying the conditions that the pixels $A_4$, $A_5$ and $A_6$ in three continuous rows are simultaneously and respectively smaller or greater than $B_1$ and $C_1$, $B_2$ and $C_2$, and $B_3$ and $C_3$ with LINE_TH1, the difference between the maximum value and the minimum value of $A_4$, $A_5$ and $A_6$ is smaller than LINE_TH2, the pixel at the present location is located in a horizontal single-pixel line, hline_map(i, j) is labeled as 1; both threshold values LINE_TH1 and LINE_TH2 are defined as 2; a final output line_map(i, j) of the line detector 204 is obtained from equation (10):

$$\text{line\_map}(i, j) = v\text{line\_map}(i, j) \| h\text{line\_map}(i, j) \quad (10)$$

a method of detecting block boundary by the block boundary detector (205) comprises: for a vertical blockboundary, when the brightness relationship between six assumed adjacent pixels $P_1$, $P_2$, $P_3$, $Q_3$, $Q_2$ and $Q_1$ close to the block boundary simultaneously satisfy three conditions of equation (11), a vertical block boundary may exist between pixels $P_3$ and $Q_3$:

Condition1: BLK_MID_TH<$D_3$<BLK_HIGH_TH;

Condition2: max($D_1$, $D_2$, $D_4$, $D_5$)<BLK_LOW_TH;

Condition3: $D_3$>max($D_1$, $D_2$, $D_4$, $D_5$). (11)

in the equations, $D_1$, $D_2$, $D_3$, $D_4$ and $D_5$ respectively represent $|P_1-P_2|$, $|P_2-P_3|$, $|P_3-Q_3|$, $|Q_3-Q_2|$ and $|Q_2-Q_1|$, BLK_LOW_TH, BLK_MID_TH and BLK_HIGH_TH take values of 2, 1 and 15;

in a 7×6 window, according to the continuity of the block boundary in a vertical direction, only if at least four continuous rows satisfy the three conditions of equation (11) and satisfy that $P_3$-$Q_3$ at least in the four continuous rows has the same mathematical symbol, then it represents that the pixel to be processed is located at a vertical block boundary with blocking artifact; after detecting the location information of block boundary with blocking artifact, determine the strength of block boundary according to equation (12), the detection result vbd_map(i, j) of block boundary in the vertical direction is shown in equation (12), wherein $P_3$ corresponds to a location of (i, j) in an image:

$$\text{vbd\_map}(i, j) = \begin{cases} 2, & \text{if} \quad |P_3 - Q_3| > 5 \cdot \text{BLK\_MID\_TH} \\ 1, & \text{else if} \quad |P_3 - Q_3| > \text{BLK\_MID\_TH} \\ 0, & \text{others} \end{cases} \quad (12)$$

taking a 6×7 window as the candidate pixel matrix, and conducting a method for detecting a horizontal block boundary, which is similar to the method for detecting a vertical block boundary, and finally obtaining a detection result of hbd_map(i, j) of a horizontal block boundary;

finally obtaining whole block boundary information bd_map(i, j) and strong block boundary information stbd_map(i, j) as the output of block boundary detector 205 in combination with the vertical and horizontal boundary information:

$$stbd\_map(i, j) = \begin{cases} 1, & \text{if} \quad [vbd\_map(i, j) == 2] \| [hbd\_map(i, j) == 2] \\ 0, & \text{others} \end{cases} \quad (13)$$

$$bd\_map(i, j) = \begin{cases} 1, & \text{if} \quad [vbd\_map(i, j) \neq 0] \| [hbd\_map(i, j) \neq 0] \\ 0, & \text{others} \end{cases} \quad (14)$$

locating, by the blocking artifact filtering area locator (206), on the basis of the block boundary information bd_map(i, j) obtained from the block boundary detector (205), an area required to be filtered at a block boundary and its surroundings; the blocking artifact filtering area locator (206) uses the third row and the third column as a 4×4 window of the pixel to be processed so as to locate a blocking artifact filtering area and to quantify the severity of the blocking artifact, the location process is shown in equation (15):

$$blk\_map(i, j) = \begin{cases} 3, & \text{if} \quad \sum_{s=-2}^{1}\sum_{t=-2}^{1} stbd\_map(i+s, j+t) \geq 1 \\ 2, & \text{else if} \quad \sum_{s=-2}^{1}\sum_{t=-2}^{1} bd\_map(i+s, j+t) \geq 1 \\ 1, & \text{else if} \quad [texture\_map(i, j) == 0] \,\&\&\, [\sim line\_map(i, j)] \\ 0, & \text{others} \end{cases} \quad (15)$$

counting, by the blocking artifact suppressing filtering enable judge (207), non-zero conditions in the present frame of block boundary information bd_map(i, j) that obtained from the above detection process, and calculating the ratio of the counting result to the pixels in a whole frame of the image, denoted as ratio;

according to the degree of severity of the blocking artifact, outputting blocking artifact suppressing filtering enable deblk_glen$_N$ with different strengths for use in a next frame;

$$deblk\_glen_N = \begin{cases} 2, & \text{if} \quad ratio > TH\_BLK\_RATIO2 \\ 1, & \text{else if} \quad ratio > TH\_BLK\_RATIO1 \\ 0, & \text{others} \end{cases} \quad (16)$$

in the equation, TH_BLK_RATIO1 and TH_BLK_RATIO2 take values of 1/64 and 23/512; if deblk_glen$_N$ is equal to 2, it represents that a video image has a relatively serious blocking artifact; if deblk_glen$_N$ is equal to 1, it represents that a video image has a relatively obvious blocking artifact that requires a blocking artifact suppressing process; if deblk_glen$_N$ is equal to 0, it represents that a video image does not have blocking artifact or has a non-obvious blocking artifact which does not require a blocking artifact suppressing process;

adaptive mean filter (208) has a brightness filtering result shown in equation (17):

$$y'(i, j) = \frac{\sum_{s=-\frac{M-1}{2}}^{\frac{M-1}{2}} \sum_{t=-\frac{N-1}{2}}^{\frac{N-1}{2}} \omega(i+s, j+t) \cdot y(i+s, j+t)}{\sum_{s=-\frac{M-1}{2}}^{\frac{M-1}{2}} \sum_{t=-\frac{N-1}{2}}^{\frac{N-1}{2}} \omega(i+s, j+t)} \quad (17)$$

$$\omega(i+s, j+t) = \begin{cases} 1, & \text{if} \quad |y(i+s, j+t) - y(i, j)| < filter\_th \\ 0, & \text{others} \end{cases} \quad (18)$$

in the equations, y(i, j) is the brightness of the present pixel to be processed; y'(i, j) is a brightness filtering result using a M×N window with y(i, j) as the central pixel during filtering; y(i+s, j+t) is a brightness value of a pixel at the location of (i+s, j+t) within a M×N window, ω(i+s, j+t) is a weight corresponding to the pixel y(i+s, j+t); and filter_th is an adaptive filtering threshold value obtained from equation (19):

$$filter\_th = \begin{cases} \alpha_1 \cdot y(i, j), & \text{a strong filtering for suppressing ringing noise} \\ \min[FILTER\_TH1, \alpha_2 \cdot y(i, j)], & \text{a weak filtering for suppressing ringing noise} \\ FILTER\_TH2, & \text{a strong filtering for suppressing blocking effect} \\ FILTER\_TH3, & \text{a weak filtering for suppressing blocking effect} \\ FILTER\_TH4, & \text{a flat area filtering for suppressing blocking effect} \end{cases} \quad (19)$$

in the equation, $\alpha_1$ and $\alpha_2$ are threshold adjusting coefficients that are independently defined to be ⅛ and 3/32; FILTER_TH1, FILTER_TH2, FILTER_TH3 and FILTER_TH4 respectively take values of 6, 15, 8 and 4;

outputting, by the adaptive filter (208), according to the different threshold values of filter_th, five types of filtering results to the filtering selector (209) that respectively indicated as a strong filtering result $y_{stdr}(i, j)$ and a weak filtering result $y_{wkdr}(i, j)$ for suppressing the ringing artifact, a strong filtering result $y_{stdb}(i, j)$ and a weak filtering result $y_{wkdb}(i, j)$ for suppressing blocking artifact, and a supplementary filtering result $y_{flatdb}(i, j)$ in a flat area;

retaining, by the filtering selector (209), according to the information ring_map(i, j) and blk_map(i, j) obtained from above, weak single pixel lines in the edge, texture and the flat area; next, according to the area where the pixel to be processed is located and the artifact strength, and the blocking artifact suppressing filtering enable deblk_glen$_{N-1}$ obtained from the previous frame select appropriate results from y(i, j), $y_{stdr}(i, j)$, $y_{wkdr}(i, j)$, $y_{stdb}(i, j)$, $y_{wkdb}(i, j)$ and $y_{flatdb}(i, j)$ as final filtering result $y_{filtered}(i, j)$ and output from the filtering selector (209); the specific selection process is shown in equation (20):

$$y_{filtered}(i,j) = \begin{cases} y(i,j), & \text{if} \quad \text{ring\_map}(i,j) == 3 \\ y_{stdr}(i,j), & \text{else if} \quad \text{ring\_map}(i,j) == 2 \\ y_{wkdr}(i,j), & \text{else if} \quad \text{ring\_map}(i,j) == 1 \\ y_{stdb}(i,j), & \text{else if} \quad [\text{blk\_map}(i,j) == 3] \;\&\&\; [\text{deblk\_glen}_{N-1} == 1] \\ y_{wkdb}(i,j) & \text{else if} \quad \{[\text{blk\_map}(i,j) == 2] \;\&\&\; [\text{deblk\_glen}_{N-1} == 1]\} \;||\; \\ & \qquad\qquad \{[\text{texture\_map}(i,j) \leq 1] \;\&\&\; \text{deblk\_glen}_{N-1} == 2\} \\ y_{flatdb}(i,j), & \text{else if} \quad \text{blk\_map}(i,j) == 1 \\ y(i,j), & \text{others} \end{cases} \quad (20)$$

conducting, by the output fusion (210), a weight sum of the original brightness value of the pixel to be processed and the filtering results from the filtering selector (209); the details is shown in equation (21):

$$y_{out}(i,j) = \lambda \cdot y(i,j) + (1-\lambda) \cdot y_{filtered}(i,j) \quad (21)$$

in the equation, $y_{out}(i,j)$ is a final brightness output and $\lambda$ is fusion weights coefficient; the value of $\lambda$ is calculated from equations (22) and (23):

$$\lambda = \begin{cases} \dfrac{1}{2}, & \text{if} \quad \left[\sum_{s=-2}^{2}\sum_{t=-2}^{2}\omega'(i+s,j+t)\right] \geq 21 \\ \dfrac{1}{4}, & \text{else if} \quad \left[\sum_{s=-2}^{2}\sum_{t=-2}^{2}\omega'(i+s,j+t)\right] \geq 16 \\ 0, & \text{others} \end{cases} \quad (22)$$

-continued $$\omega'(i+s, j+t) = \begin{cases} 1, & \text{if} \; |y(i+s,j+t) - y(i,j)| \leq \text{BLEND\_TH} \\ 0, & \text{others} \end{cases} \quad (23)$$

in the equation, $\omega'(i+s, j+t)$ represents brightness differences between a central pixel and other pixels within a 5×5 window with pixel (i, j) being a central pixel, and the threshold value BLEND_TH is defined to be 3.

\* \* \* \* \*